Oct. 8, 1957 L. T. COUGHLIN 2,808,673
FISH HOOK ASSEMBLY
Filed May 8, 1956
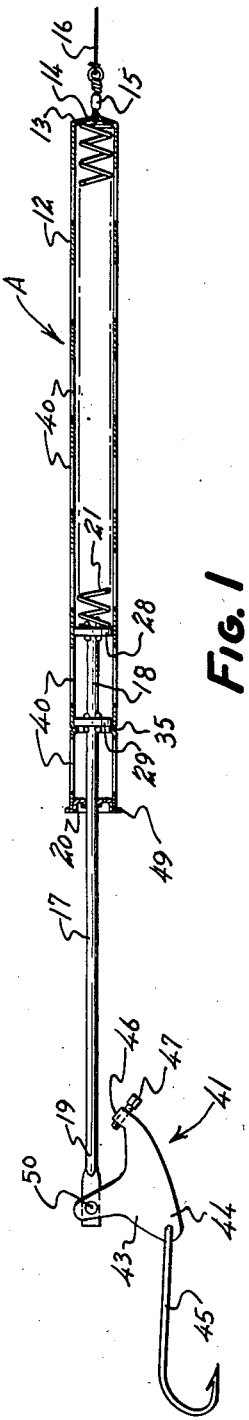
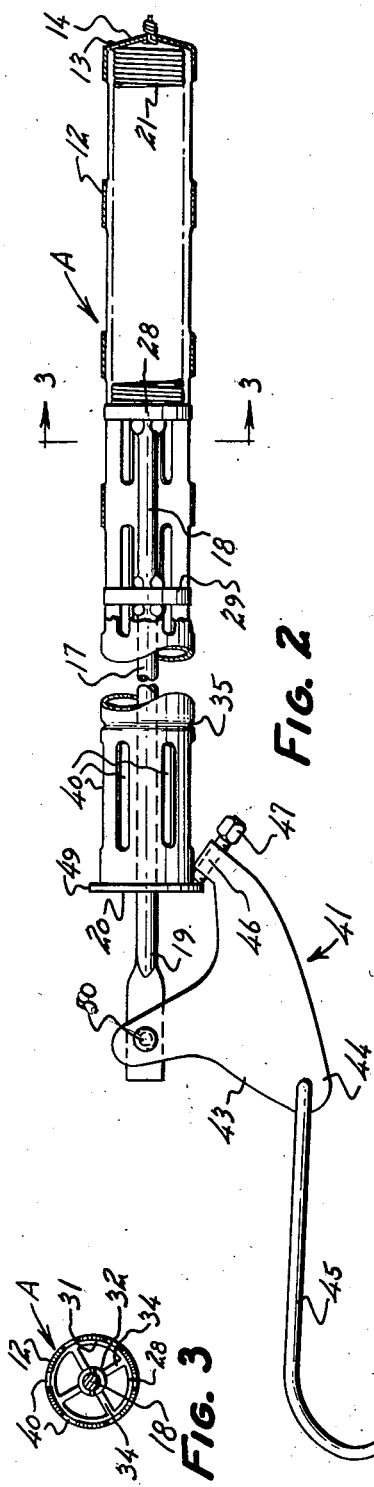
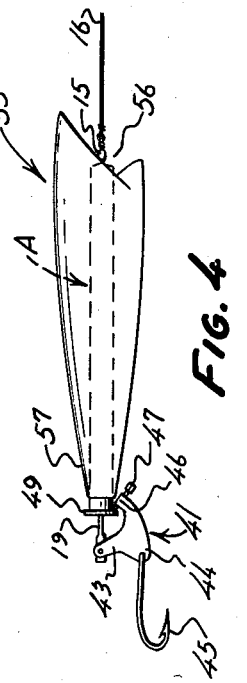
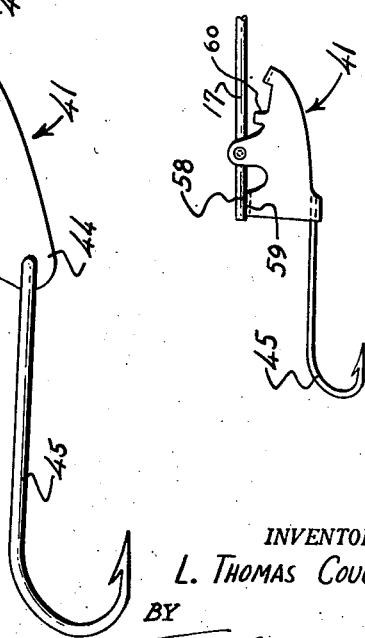
INVENTOR.
L. THOMAS COUGHLIN
BY
Townsend and Townsend
ATTORNEYS

United States Patent Office 2,808,673
Patented Oct. 8, 1957

2,808,673

FISH HOOK ASSEMBLY

Luke Thomas Coughlin, Albany, Calif.

Application May 8, 1956, Serial No. 583,582

6 Claims. (Cl. 43—15)

This invention relates to a spring acruated fish hook assembly.

Many fishermen have lost a catch because a fish has attacked the bait and stolen it without getting hooked. Fish also frequently escape in cases where a hook is only insecurely imbedded in a fish's mouth.

A principal object of the present invention is to provide a fish hooking assembly which is triggered by the initial bite or strike of the fish to force the fish hook far into the fish's mouth, whereby a secure hooking engagement is obtained.

Another feature and object of the invention is that the assembly is readily mounted in a flat fish, spinner or similar type of artificial lure so that the mechanism of the invention may be adequately concealed or camouflaged.

Still another feature of the invention is that it can be used in unarmed condition as a conventional hook.

Other objects of the present invention will become apparent upon reading the following specification and referring to the accompanying drawings in which similar characters of reference represent corresponding parts in each of the several views.

Fig. 1 is a detailed sectional view of an embodiment of the invention shown in extended or fired position.

Fig. 2 is an elevational view of the embodiment of Fig. 1 shown in compressed or armed condition.

Fig. 3 is a sectional view taken at line 3—3 of Fig. 2.

Fig. 4 is an elevational view of the spring actuated fish hooking assembly shown mounted in a flat fish.

Fig. 5 is a fragmentary view of a modification of the invention.

The embodiment of the invention shown in the drawings comprises a fish hooking assembly, indicated generally at A, and which said assembly includes a tubular hollow body 12 having one end 13 sealed by a cap 14 to which a swivel connector 15 is attached to join the hooking assembly to the outer end of a fishing line 16. An arm 17 is reciprocally mounted within the bore of body 12 and includes one portion 18 within the bore and another portion 19 projecting exteriorly from apertured rearward or trailing end 20 of the body. A spring 21 disposed between cap 14 and arm portion 18 urges arm 17 out of the body through open end 20. The arm 17 is axially aligned within the bore of body 12 by two spaced pistons 28 and 29 each formed with an annular ring 31 slidably engaged within the bore and a hub 32 rigidly connected to arm 17 with spokes 34 joining the hub and the ring.

Body 12 is formed with a plurality of apertures 40 to provide fluid escape holes through which water within the bore of body 12 may be eliminated when arm 17 is reciprocated. Holes 40 and the spaces between spokes 34 of pistons 28 and 29 provide adequate openings to allow rapid movement of the arm without fluid pressure building up within the bore and restraining motion of the arm therein. An annular abutment or stop 35 projects inwardly into the bore of the body 12 adjacent end 20 to limit outward movement of the arm by engagement with guide piston 29.

A latch mechanism 41 is pivotally mounted on the end of arm 17 to lock the arm in armed position (as shown in Fig. 2) with spring 21 under compression and arm 17 moved far into body 12. More specifically, the latch mechanism comprises a lever or bell crank 43 including an arm 44 mounting a fish hook 45. A second arm 46 carries an adjustable screw 47 which functions as a catch to lock against a flange 49 projecting radially from the outer wall of body 12 adjacent end 20. Latch mechanism 41 is pivoted about a pin 50 so that when hook 45 is pulled or subjected to abnormal external force (as by a fish taking bait on the hook), catch screw 47 will pivot out of engagement with flange 49. Release of screw 47 from engagement with flange 49 allows arm 17 to reciprocate rapidly under influence of compression spring 21 to force the arm and hook 45 deep into the fish's mouth and insure a more secure hooked engagement with the fish. The pistons 28 and 29 being formed of open spoke construction, and body 12 being formed with escape holes or apertures 40, prevents water pressure from impeding high velocity release of arm 17 so the hook is with great velocity forced into the mouth of the fish.

Catch screw 47 is adjustable to vary the pressure a fish must exert against hook 45 to disengage catch screw 47 from flange 49. This adjustment facilitiates either a light trigger pull for quiet waters and where small fish are being sought, or a heavier trigger pull for roughers waters or where larger fish are sought after.

The fish hook assembly may be mounted in a flat fish body 55 to disguise or camouflage the mechanism as shown in Fig. 4. In such case assembly A is mounted with body 12 longitudinally disposed in the body of flat fish 55, and swivel connector 15 is disposed adjacent the front of mouth 56 of the flat fish. End 20 of body 12 together with flange 49 and latch mechanism 41 project from the rear of the flat fish indicated at 57. The assembly may also be mounted in conjunction with spinners or flies.

Referring specifically to Fig. 5 the latch mechanism 41 may be provided with a stop 59, and the arm 17 with an extension 58 to engage with the stop to prevent the hook from pivoting clockwise beyond the stop after the latch mechanism 41 is released from flange 49. A stop 60 may also be provided on latch mechanism 41 to engage with arm 17 to prevent counterclockwise rotation of the latch mechanism. This arrangement is useful in keeping hook 45 in more or less fixed alignment with respect to the arm 17.

Although the foregoing invention has been described in some detail by way of illustration and example for purposes of clarity of understanding, it is understood that certain changes and modifications may be practiced within the spirit of the invention as limited only by the scope of the appended claims.

It is claimed:

1. A fish hook device comprising a housing, an arm reciprocally carried by said housing, spring means within said housing operable to urge said arm in a first direction with respect to said housing, latch means pivotally mounted on the end of said arm to lock against said housing to hold said arm against movement in the first direction with said spring means under tension, said latch means operable to pivot to release said arm from locked engagement with said housing to free said arm and allow it to move in said first direction, and a fish hook connected to said latch means to release said latch means upon being forcefully pulled, whereby said fish hook is forced to move in said first direction with said arm under influence of said spring means.

2. A fish hook device comprising a hollow tubular housing, means to attach a fish line to a first end of said housing, an arm reciprocally mounted in said housing and having a first end within the bore of said housing, and a second end projecting exteriorly of said housing from the second end of said housing, piston spacers rigidly mounted on said arm and slidably mounted within the bore of said housing to retain said arm in axial alignment within said housing, stop means projecting into the bore of said housing adjacent the second end thereof to limit movement of said arm in a first direction, a compression spring in the bore of said housing between the first end of said housing and the first end of said arm normally urging said arm to move in said first direction, a radially projecting annular flange on the outside wall of and adjacent the second end of said housing, a lever pivotally mounted on the second end of said arm, said lever having a catch operable in a first position to engage said flange to lock said arm with said spring in compressed condition and also operable to pivotally force said catch to a second position and out of engagement with said flange to allow said spring to forcefully urge and rapidly move said arm in the said first direction, and fish hook means connected to said lever to actuate said lever to its second position upon external force being exerted against said hook.

3. A claim according to claim 2 and wherein said housing and said spacer pistons are apertured for fluid pressure escape to prevent fluid pressure build-up within said housing bore and from impeding motion of said arm in said first direction.

4. A claim according to claim 2 and wherein said catch is provided with an adjustable means to regulate the minimum external force acting against said hook which is necessary to actuate said lever to its second position.

5. A fish hook assembly comprising; a body, an arm reciprocally mounted relative to said body and a hook carried by said arm movable from a first position adjacent the trailing end of said body to a second position spaced further rearwardly from said trailing end, spring means normally forcefully urging said arm and hook carried thereby toward said second position, releasable lock means pivotally mounted on said arm arranged to lock with said body to lock said arm in the first position, said lock means connected to said hook whereby upon external force being exerted thereagainst said locking means is pivoted and unlocked from said body to allow movement of said arm and hook to said second position under influence of said spring means.

6. A claim according to claim 5 and wherein said lock means is pivotally mounted on the trailing end of said arm, said hook is rigidly mounted on said lock means, and said lock means includes stop means to operatively engage said arm to limit the degree of pivotal movement of said lock means.

References Cited in the file of this patent

UNITED STATES PATENTS

| | | |
|---|---|---|
| 1,072,672 | Sweet | Sept. 9, 1913 |
| 1,604,031 | Ferguson | Oct. 19, 1926 |
| 1,670,275 | Willoughby | May 15, 1928 |
| 1,745,834 | Horikoshi | Feb. 4, 1930 |
| 1,767,723 | Vasilevsky | June 24, 1930 |
| 2,009,298 | Nelson et al. | July 23, 1935 |
| 2,080,238 | Stoher | May 11, 1937 |
| 2,505,052 | Kridler | Apr. 25, 1950 |
| 2,557,030 | Inglis | June 12, 1951 |
| 2,560,875 | Knott | July 17, 1951 |